United States Patent [19]

Chen

[11] Patent Number: 5,562,174
[45] Date of Patent: Oct. 8, 1996

[54] WHEEL ASSEMBLY FOR A WHEELCHAIR

[76] Inventor: Sen-Jung Chen, No. 236, Sec. 3, Ho-Ping W. Rd., Taipei, Taiwan

[21] Appl. No.: 440,748

[22] Filed: May 15, 1995

Related U.S. Application Data

[63] Continuation-in-part of Ser. No. 117,867, Sep. 7, 1993, Pat. No. 5,477,935.

[51] Int. Cl.$^6$ .............................. B60K 1/00; B60K 7/00
[52] U.S. Cl. ...................... 180/65.5; 180/65.6; 180/907
[58] Field of Search ...................................... 180/6.5, 65.5, 180/65.6, 60, 65.1, 366, 373, 907; 280/250.1, 304.1

[56] References Cited

U.S. PATENT DOCUMENTS

| | | | |
|---|---|---|---|
| 3,930,551 | 1/1976 | Cragg | 180/907 X |
| 3,955,639 | 5/1976 | Cragg | 180/907 X |
| 4,570,739 | 2/1986 | Kramer | 180/907 X |
| 5,094,310 | 3/1992 | Richey et al. | 180/907 X |
| 5,186,269 | 2/1993 | Avakian et al. | 180/907 X |
| 5,199,520 | 4/1993 | Chen | 180/907 X |
| 5,350,032 | 9/1994 | Smith | 180/907 X |

FOREIGN PATENT DOCUMENTS

| | | | |
|---|---|---|---|
| 2405445 | 8/1994 | Germany | 180/907 |

*Primary Examiner*—Brian L. Johnson
*Attorney, Agent, or Firm*—Ladas & Parry

[57] ABSTRACT

A wheel assembly for a wheelchair includes a mounting plate fixed on one side of the seat portion, a motor and a gear unit which includes a gear disc, and a gear shaft that extends through the gear disc. The motor includes a driving worm fixed on the motor shaft so as to mesh with the gear disc. The gear disc is formed with an engaging recess. The gear shaft carries a slidable transverse key thereon. A spring biases the gear shaft to engage the key in the recess. A driving gear is fixed on the gear shaft. A driven gear is mounted rotatably on the mounting plate and is fastened to a wheel. A chain interconnects the driving gear and the driven gear. A hand lever can be moved against the bias action of the spring so as to disengage the key from the recess of the gear disc.

2 Claims, 3 Drawing Sheets

WHEEL ASSEMBLY FOR A WHEELCHAIR

CROSS-REFERENCE OF RELATED APPLICATION

This invention is a continuation-in-part application of U.S. patent application Ser. No. 08/117,867, which was filed on Sep. 7, 1993 and issued as U.S. Pat. No. 5,477,935.

BACKGROUND OF THE INVENTION

1. Field of the Invention

The invention relates to a wheelchair, more particularly to an improved wheel assembly for a wheelchair which requires a relatively small force to rotate the wheel assembly manually.

2. Description of the Related Art

A conventional wheelchair includes a seat portion, a pair of circular mounting plates secured respectively on two sides of the seat portion, and a pair of driven wheels. Each of the mounting plates has a fixed shaft extending therefrom, a driving unit and a gear unit which are installed on the mounting plate. Each of the driving units is driven by a rechargeable battery unit that is mounted on the corresponding mounting plate. Each of the driven wheels has a circular central portion formed with a through-hole, an annular neck flange extending from the central portion around the through hole, and an annular toothed portion formed around the flange. The flange of each of the driven wheels is sleeved rotatably on the fixed shaft of the respective mounting plate. During assembly, the annular toothed portion of each of the driven wheels is arranged to mesh with a toothed wheel of the respective gear unit so that rotation of the driving unit is transmitted to the driven wheel.

A main drawback of the conventional wheelchair is that the wheels cannot be disconnected from the gear units. Thus, the user has to exert a considerable force in order to rotate the wheels of the wheelchair whenever manual operation is desired.

SUMMARY OF THE INVENTION

Therefore, the object of this invention is to provide an improved wheel assembly for a wheelchair in which the wheel can be easily rotated by hand.

Accordingly, the wheel assembly for a wheelchair of this invention includes a mounting plate fixed on one side of the seat portion, a motor and a gear unit which are installed on the mounting plate. The gear unit includes a gear disc, and a gear shaft which extends through the gear disc. The motor includes a driving worm fixed on the motor shaft so as to mesh with the gear disc. The gear disc is formed with an engaging recess. The gear shaft carries a slidable transverse key thereon. A spring biases the gear shaft to engage the transverse key in the recess of the gear disc, thereby rotating the gear disc synchronously with the gear shaft. A driving gear is fixed on the gear shaft. A driven gear is mounted rotatably on the mounting plate and is fastened to a driven wheel. A chain interconnects the driving gear and the driven gear. A control unit is installed on the mounting plate and includes a hand lever connected operably to the gear shaft. If manual operation of the driven wheel is desired, the hand lever can be pushed against the bias action of the spring so as to disengage the key from the gear disc so as to enable the gear disc to rotate idly relative to the gear shaft.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

Figure 1:
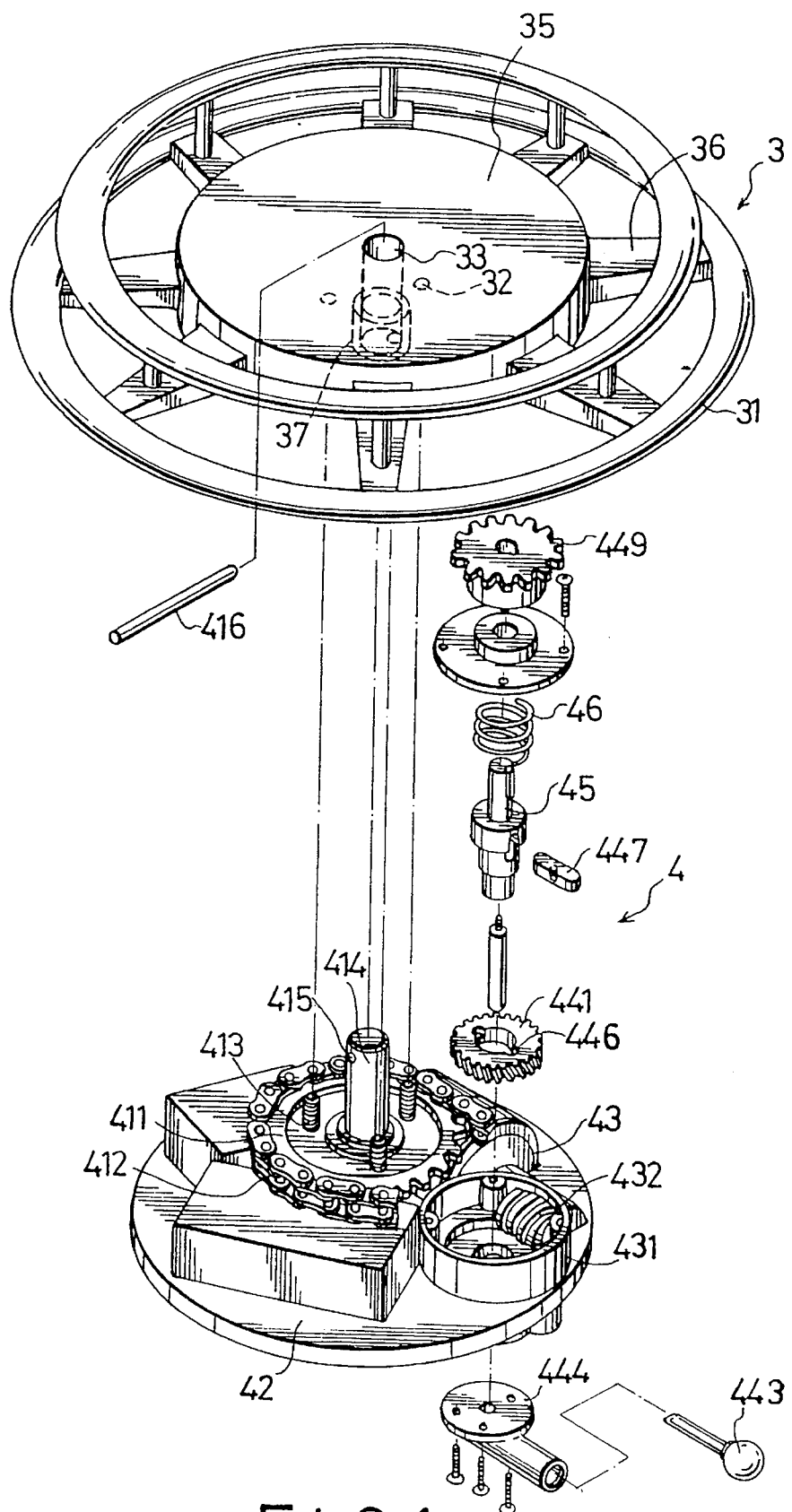
FIG. 1 shows a circular mounting plate and a wheel of the preferred embodiment of a wheel assembly according to this invention.
Figure 2:
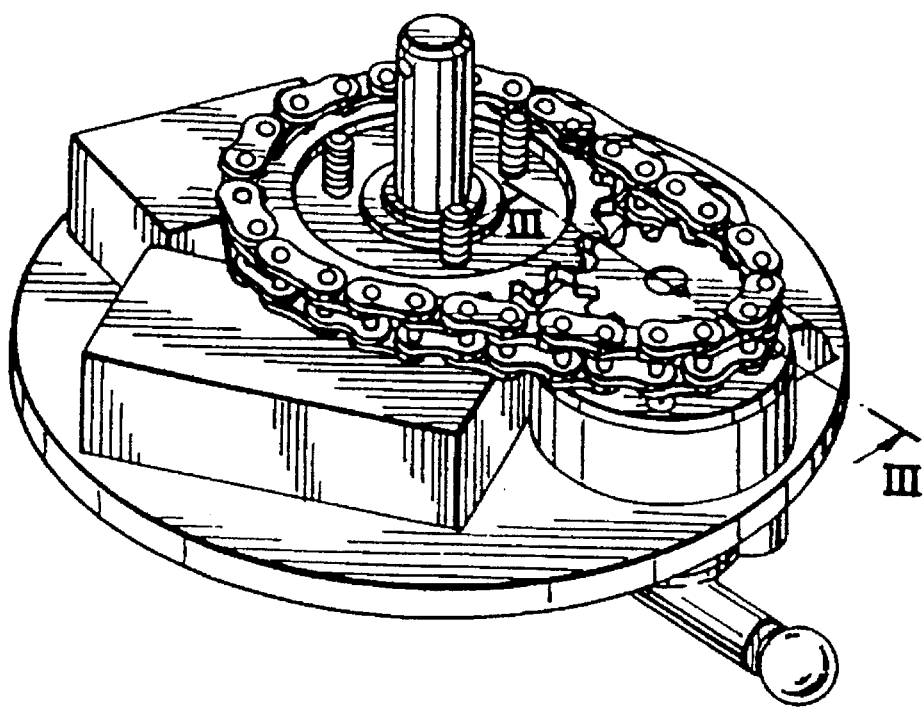
FIG. 2 is a perspective view of the mounting plate shown in FIG. 1.

Referring to FIGS. 1 and 2, a wheel assembly of this invention includes a circular mounting plate 42 on which a driving unit 43 and a gear unit 4 are fixed, and a driven wheel 3.

As illustrated in FIG. 1, the driving unit 4 includes an enclosed casing 431 fixed on the mounting plate 42, a gear disc 441 disposed within the casing 431, and a gear shaft 45 which extends into the gear disc 441 and which projects outwardly from the casing 431. The gear disc 441 has an external toothed periphery, an inner periphery which defines a through-hole therein, and a pair of diametrically opposed recesses 446 formed in the inner periphery thereof. The gear shaft 45 has an intermediate portion that carries a slidable transverse key 447 thereon.

A driving gear 449 is fixed on the portion of the gear shaft 45 which projects from the casing 431. A biasing spring 46 is disposed inside the casing 431 and biases the gear shaft 45 to engage the transverse key 447 in the engaging recesses 446 of the gear disc 441 in a normal condition.

The motor 43 has a motor shaft provided with a fixed driving worm 432 which extends into the enclosed casing 431 to mesh with the external toothed periphery of the gear disc 441. A rechargeable battery is mounted on the mounting plate 42 and supplies power to the motor 43.

A driven gear 411 is mounted rotatably on the fixed shaft 414 of the mounting plate 42, and has three spaced axial posts 413. An endless chain 412 interconnects the driving and driven gears 449, 411.

The driven wheel 3 has a circular central plate 35 formed with a through hole 33 therethrough, a peripheral rim 31 and a plurality of spokes 36 which extend radially from the central plate 35 to connect with the rim 31. The wheel 3 further has an annular neck flange 37 formed integrally with the central plate 35 and located around the through-hole 33, and three axially extending bores 32 formed in the central plate 35 around the flange 37. The annular flange 37 of the wheel 3 is sleeved on the fixed shaft 414 of the mounting plate 42 in such a manner that the axial posts 413 of the mounting plate 42 extend into the bores 32 of the central plate 35 of the wheel 3 so that the wheel 3 rotates synchronously with the driven gear 411. The free end of the fixed shaft 414 protrudes from the through-hole 33 of the wheel 3. A locking pin 416 extends through the radial hole 415 of the fixed shaft 414 so as to prevent disengagement of the wheel 3 from the fixed shaft 414.

Figure 3:
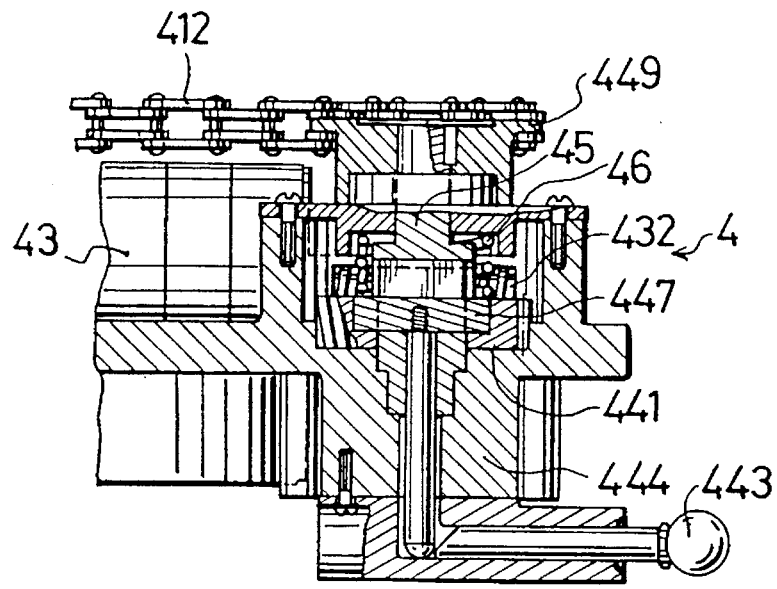
FIG. 3 is a sectional view of the mounting plate taken along line III—III in FIG. 2, illustrating how a control unit engages the wheel and the gear unit of the wheel assembly of this invention.
Figure 4:
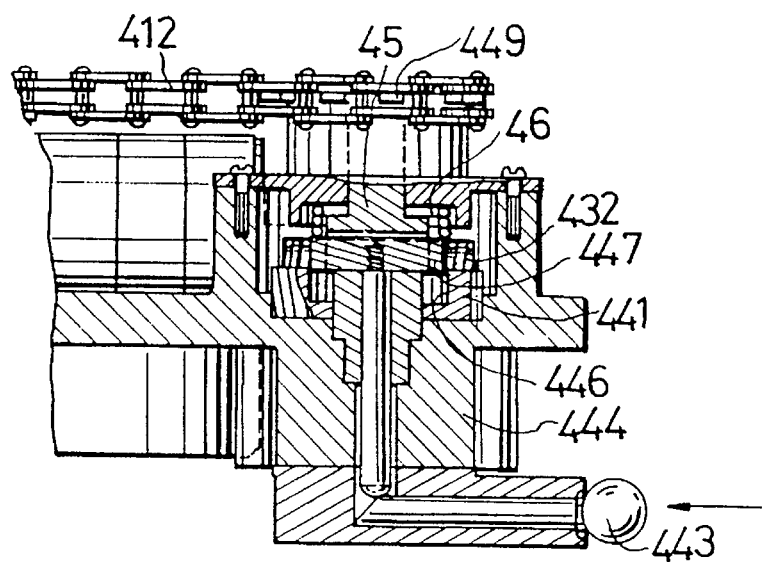
FIG. 4 is a sectional view of the mounting plate, illustrating how the control unit disengages the wheel from the gear unit of the wheel assembly of this invention.

Referring to FIGS. 3 and 4, the wheel assembly of this invention further includes a control unit constituted by a substantially L-shaped casing 444 fixed on the mounting plate 42, and an operable hand lever 443 inserted slidably into the casing 444. The hand lever 443 has a tapered end portion connected operably with a round end portion of the gear shaft 45.

In case of battery failure or when manual operation is desired, the hand lever 443 of the control unit can be pushed in the direction shown by the arrow in FIG. 4. The gear shaft 45 is pushed against biasing action of the spring 46 so as to disengage the transverse key 447 of the gear shaft 45 from the recesses 446 of gear disc 441, thus enabling rotation of the gear disc 441 about the gear shaft 45. The wheel assembly of this invention is thus converted into an manual operation type. At this time, only a small amount of force is required to apply to and rotate the wheel assembly of this invention by hand.

In this embodiment, the gear disc 441 and the driving worm 432 are located within the enclosed casing 431. Since the endless chain 412 is used to transmit rotation to the wheel, the wheel assembly of this invention generates little noise when in motion.

With the present invention thus explained, it is obvious to those skilled in the art that various modifications and variations can be made without departing from the scope and spirit thereof. It is therefore intended that the present invention be limited only as in the appended claims.

I claim:

1. A wheel assembly for a wheelchair including a mounting plate adapted to be fixed on one side of a seat portion of the wheelchair, and formed with a fixed shaft, a motor mounted on the mounting plate and having a motor shaft provided with a fixed driving worm, and a gear unit disposed on the mounting plate, wherein the improvement comprises:

the gear unit including a gear disc having an external toothed periphery meshed with the fixed driving worm, an inner periphery defining a through-hole therein, an engaging recess formed in the inner periphery, and a gear shaft which carries a slidable transverse key thereon and which extends into the gear disc;

a biasing spring biasing the gear shaft to engage the key in the engaging recess;

a driving gear fixed on the gear shaft;

a driven gear mounted rotatably on the fixed shaft of the mounting plate;

an endless chain interconnecting the driving gear and the driven gear;

a driven wheel sleeved rotatably on the fixed shaft and fastened to the driven gear so that the wheel rotates synchronously with the driven gear; and a control unit disposed on the mounting plate and including a hand lever connected operably to the gear shaft and adapted to be operated so as to move the gear shaft, thereby disengaging the transverse key from the gear disc.

2. The wheel assembly as defined in claim 1, wherein the driven gear has three spaced axial posts, the wheel including a rim, a circular central plate formed with three axially extending bores in which the posts are respectively engaged, and a plurality of spokes interconnecting the rim and the central plate.

* * * * *